Oct. 15, 1946.   J. E. GALL   2,409,204
SHAFT LOCKING DEVICE
Filed Aug. 18, 1945

Inventor
JAMES E. GALL
By Ralph L. Chappell
Attorney

Patented Oct. 15, 1946

2,409,204

UNITED STATES PATENT OFFICE 2,409,204

SHAFT LOCKING DEVICE

James E. Gall, Washington, D. C.

Application August 18, 1945, Serial No. 611,427

1 Claim. (Cl. 188—74)

(Granted under the act of March 3, 1883, as amended April 30, 1928; 370 O. G. 757)

This invention relates to shaft locking devices.

In employing certain types of mechanical or electrical apparatus, having associated therewith one or more adjustable control elements, it may be desirable that some of the control elements be provided with means for locking the elements in adjusted position. For example, in employing electrical apparatus it is often the case that some of the adjustable control elements incorporated therein must be adjusted only infrequently and that once adjusted, it is necessary that the adjusted position be maintained accurately.

An object of this invention is to provide a new and improved shaft locking device.

A further object of this invention is to provide a shaft locking device adapted to be associated with a control element, such as a potentiometer, which will permit ready adjustment of the control element and which is adapted to lock the control element to maintain the adjusted position thereof.

In accordance with one embodiment of this invention, a shaft locking device may be provided having a portion adapted to be rigidly mounted about a shaft housing and an integral portion thereof disposed about and adapted to be bent to engage the shaft to prevent rotation thereof with respect to the housing.

In accordance with a second embodiment of this invention, a shaft locking device may be provided having a member thereof adapted to be rigidly mounted about a shaft housing and an associated member thereof disposed about the shaft and adapted to be pivoted on an axis spaced from the periphery of the shaft to cause it to engage the shaft to prevent rotation thereof with respect to the housing.

Other objects and advantages of the present invention will be apparent from the following detailed description taken in conjunction with the drawing, wherein.

Figure 1:
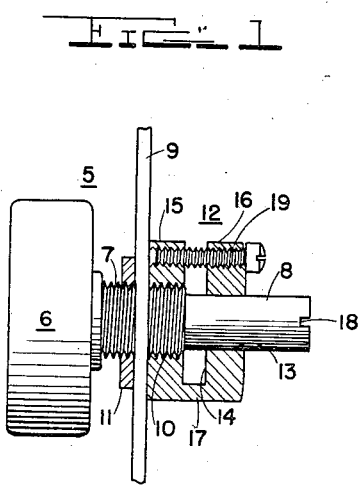
Fig. 1 is a vertical, sectional view partly in elevation, of an electrical control element having associated therewith a shaft locking device constructed in accordance with the first embodiment of this invention.

Referring now to the drawing, and particularly to Fig. 1 thereof, wherein for purposes of illustration an electrical control element 5, such as a potentiometer, is shown having a large cylindrical housing 6 from the center of the right side of which extends an externally threaded sleeve shaped housing 7, a rotatable control shaft 8 being journalled in and extending through the shaft housing 7. The control element 5 may be supported in a suitably apertured panel 9 through which extends the shaft housing 7. The control element 5 is rigidly fixed to the panel 9 by an adjustable nut 11 threaded on the left portion of the shaft housing 7 and which bears against the left side of the panel 9, and a shaft locking device designated generally as 12 which is threadedly mounted on the right portion of the shaft housing 7 and adjusted thereon to bear against the right side of the panel 9.

The shaft locking device 12 is formed from a block which may have any suitable external configuration, such, for example, as the hexagonal shape shown, and which is provided with an axially extending circular aperture 13. A deep slot or recess 14 is formed through the center portion of the shaft locking device and extends substantially at right angles to the axis of the aperture 13 from one side of the device to a point between the opposite side thereof and the edge of the aperture 13, thus, in effect, dividing the device into two parallel end portions 15 and 16, joined by an intermediate side portion 17.

The part of the aperture 13 formed through the end portion 15 is internally threaded and made sufficiently large to be mounted on and threadedly engage the portion 10 of the externally threaded shaft housing 7 which extends to the right of the panel 9, as viewed in Fig. 1, and is adjusted on the shaft housing so that in cooperation with the nut 11 it serves to mount the electrical control element 5 rigidly on the panel 9. The position of the nut 11 is so selected with reference to the length of the shaft housing 7 extending to the right of the panel 9 that when the control element is rigidly secured to the panel 9, the left side of the slot 14 substantially coincides with the end of the shaft housing 7. The portion of the shaft 8 which extends beyond the end of the shaft housing 7 extends through the part of the aperture 13 formed in the end portion 16 of the shaft locking device 12.

In using this shaft locking device, the position of the shaft may be adjusted by inserting the end of a screw driver or other suitable device in a slot 18 formed in the outer end of the shaft 8 and rotating the shaft. Then in order to lock the shaft 8 in adjusted position a screw 19, which extends substantially parallel to the axis of the shaft 8 through the upper portion of the end member 16, as viewed in Fig. 1, and which threadedly engages the corresponding portion of the end member 15, is tightened to cause the end member 16 to pivot toward the end member 15 about an axis corresponding substantially to the base of the slot 14. It will be apparent that since the member 15 is rigidly fixed to the shaft housing 7, being threaded thereto as hereinbefore described, the member 16 will, as the screw 19 is tightened, be bent to the left about an axis substantially corresponding to the base of the slot 14 and will engage the shaft 8. By tightening the screw 19 sufficiently, the member 16 may be caused to engage tightly the shaft 8, thus locking it with respect to the housing 7. A particular advantage of the present shaft locking device as used with shafts adjustable by a screwdriver is that having adjusted the position of the shaft by the screwdriver, it is not necessary to shift tools but rather the screwdriver may also be used to operate the locking device.

Figure 3:
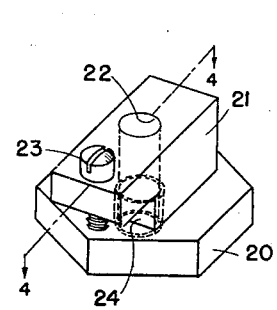
Fig. 3 is a detail, perspective view of a shaft locking device constructed in accordance with the second embodiment of this invention.
Figure 4:
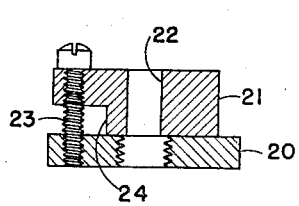
Fig. 4 is a vertical sectional view taken substantially along the line 4—4 of Fig. 3.

In the alternative embodiment of this invention shown in Figs. 3 and 4, a locking device for a shaft is illustrated wherein the two end members of the locking device are not integrally joined. In this alternative shaft locking device, a nut 20 is substituted for the end member 15 and in use is threaded on the portion of the shaft housing 7 extending beyond panel 9 similarly to the member 15. A block 21 having a circular aperture 22 formed through the center thereof of suitable size to receive the shaft to be locked is disposed about the portion of the shaft 8 which extends beyond the housing 7, the shaft extending through the aperture 22, and the block 21 is connected to the nut 20 by an adjustable screw 23 loosely carried by the block 21 and threaded into the nut 20. A recess 24 is formed in the side of the block 21 adjacent the nut 20 and extends from the side of the block 21 to a point intermediate the side and the aperture 22 formed therethrough, as shown in the drawing.

Figure 2:
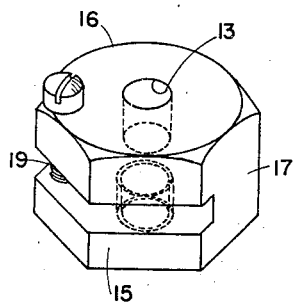
Fig. 2 is an enlarged, detail, perspective view of the shaft locking device shown in Fig. 1.

In using this alternative locking device, the shaft 8 is adjusted to the desired position in the same manner as when the shaft locking device shown in Fig. 2 is employed, and then the screw 23 is tightened to cause the block 21 to pivot on an axis corresponding to the edge of the recess 24 resting on the nut 20. Pivoting of the block 21 causes the sides of the aperture 22 to engage the periphery of the shaft 8 and to rigidly lock the shaft 8 and prevent rotation thereof with respect to the shaft housing.

Where herein the various parts of the invention have been referred to as being located in a right or left position, it will be understood that this is done solely for the purpose of description, and that the references relate only to the relative position of the parts as shown in the accompanying drawing.

While but two embodiments of this invention have been shown and described, it will be understood that many changes and modifications may be made therein without departing from the spirit or scope of the present invention, which is limited only by the appended claim.

The invention shown and described herein may be manufactured or used by or for the Government of the United States of America for governmental purposes without the payment of any royalties thereon or therefor.

What is claimed is:

In combination, a rotatable shaft, a housing for said shaft, and a shaft locking device comprising an axially apertured block having a slot formed therein extending from one side thereof at substantially right angles to the aperture to a point intermediate the opposite side thereof and the edge of the aperture, thus substantially dividing said block into two end portions joined by an intermediate side portion, means for securing one of said end portions to said shaft housing, and means associated with said block for pivoting said other portion toward said first portion about an axis substantially corresponding to the base of said slot to cause said pivoted portion to engage said shaft.

JAMES E. GALL.